United States Patent

Wung et al.

Patent Number: 5,111,588
Date of Patent: May 12, 1992

[54] LEVEL VIAL

[76] Inventors: Wen-Pin Wung, No. 146, Chi-Kuang St., Chung Dist., Taichung City; Wen-Jenn Worng, No. 28, Alley 1, Ta-Ho I Lane, Hsi-Tun Dist., Taichung City, Taiwan

[21] Appl. No.: 744,982

[22] Filed: Aug. 14, 1991

[51] Int. Cl.⁵ .......................... G01C 5/04; G01C 9/22
[52] U.S. Cl. ........................................................ 33/367
[58] Field of Search ........................................ 33/367

[56] References Cited

U.S. PATENT DOCUMENTS 2,150,048  3/1939  Boyd .................................. 33/367
3,132,428  5/1964  Haissig et al. .................... 33/367

FOREIGN PATENT DOCUMENTS 126620  4/1959  U.S.S.R. ............................ 33/367

Primary Examiner—Harry N. Haroian
Attorney, Agent, or Firm—Willian Brinks Olds Hofer Gilson & Lione

[57] ABSTRACT

A level vial includes a pair of elongated vessels, each having a top open end, a bottom open end and a transparent tube portion having a flat side wall extending between the top open end and the bottom open end. A flexible elongated pipe has two ends respectively connected to the bottom open end of the elongated vessels to communicate with the transparent tube portion so as to contain water therein. The transparent tube portion of the elongated vessels may be selectively vented with the ambient environment. A float restraining member is fixed to and extends inwardly from an inner wall surface of the transparent tube portion of each of the elongated vessels. The float restraining member is disposed adjacent to the top open end of the elongated vessel and defines an axial through hole. A floating article is provided in the transparent tube portion of each of the elongated vessels inwardly of the float restraining member. The floating article blocks the axial through hole of the float restraining member when water inside the transparent tube portion rises to the vicinity of the top open end of the elongated vessel.

11 Claims, 4 Drawing Sheets

LEVEL VIAL

BACKGROUND OF THE INVENTION

1. Field of the Invention

The invention relates to a level measuring instrument, and more particularly to a level vial which is used to accurately level two points that are far apart or otherwise difficult to measure.

2. Description of the Related Art

Hydrostatic leveling instruments are known in the art. Such instruments are widely applied in determining the vertical displacement of two points and are also used to lay out a horizontal line or to level two points that are far apart or otherwise difficult to measure.

Co-pending U.S. patent application Ser. No. 07/644,921 by the applicants discloses two embodiments of a level vial to be used for the above purposes. The main drawbacks of the level vials disclosed in the above cited co-pending application are as follows:

1. The cross-section of a transparent tube of the level vials is annular. Thus, when the transparent tube is placed against a vertical wall surface so as to mark a height level on the same, the tip of the marking pen should be properly inserted in the space defined by the transparent tube and the wall surface. The marking pen is thus handled in an awkward position, thereby causing one to easily make a mistake.

2. In the above cited level vials, water is easily retained in the small clearance formed between the transparent tube and a floating article confined therein. Therefore, water trapped in the space above the floating article is obstructed from flowing back into the water reservoir inside the transparent tube. It is thus necessary to constantly shake the level vial so as to release the water retained in the clearance and permit water to flow back into the water reservoir.

3. Since water is retained in the clearance, air bubbles in the water reservoir cannot be vented to the ambient atmosphere, thereby affecting the accuracy of the level vial.

4. The above cited conventional level vials are not provided with a water valve means to control the flow of water into and out of the transparent tubes.

SUMMARY OF THE INVENTION

Therefore, the objective of the present invention is to provide an improved level vial construction which overcomes the drawbacks commonly associated with the above mentioned prior art.

Accordingly, the preferred embodiment of a level vial of the present invention comprises: a pair of elongated vessels, each of which includes a transparent tube portion having a top open end, a bottom open end and a flat side wall extending from the top open end to the bottom open end, a gradually tapered portion extending from the top open end of the transparent tube portion, a neck portion extending outwardly from one end of the tapered portion, and an annular flange extending inwardly from said one end of the tapered portion and defining an axial opening; a flexible elongated pipe having two ends respectively connected to the bottom open end of the transparent tube portion of the elongated vessels to communicate with the transparent tube portion so as to contain water therein; and a pair of air venting means. Each of the air venting means includes: a solid cylindrical air guide member having a lower end portion sealingly extending into the neck portion, an upper end portion extending outwardly from the lower end portion, an axial through opening and axially extending air passages; a tubular rotary cap having a closed top end and a lower portion screwed to the upper end portion of the air guide member; an axial guide shaft extending inwardly from the closed top end of the rotary cap through the axial through opening of the air guide member and having a distal end provided with a piston to selectively extend into the annular flange and seal the axial opening of the annular flange; and a spring means provided around the guide shaft and maintaining the rotary cap away from the air guide member when the rotary cap is unscrewed from the air guide member. The level vial further includes two float restraining members, two floating articles, and two water valve means. Each float restraining member is fixed to and extends inwardly from an inner wall surface of the transparent tube portion of each of the elongated vessels. The float restraining members are disposed adjacent to the top open end of the transparent tube portion and define an axial through hole. Each floating article is provided in the transparent tube portion of one of the elongated vessels inwardly of the float restraining member. Each floating article includes an outer ring in sliding contact with the inner wall surface of the transparent tube portion, a hollow body surrounded by and confining a clearance with the outer ring, the hollow body having tapered top and bottom ends, and a plurality of spaced connecting ribs to join the outer ring and the hollow body. The tapered top end of the hollow body is provided with a ball portion to block the axial through hole of the float restraining member when water inside the transparent tube portion rises to the vicinity of the top open end thereof. Each water valve means is provided on the bottom open end of the transparent tube portion of one of the elongated vessels, and includes: a hollow valve housing having a first end connected to the bottom open end of the transparent tube portion and a second end connected to one end of the flexible elongated pipe, the hollow valve housing defining a plug receiving space disposed between the first and the second ends, the hollow valve housing having a first port opening at the first end so as to communicate the plug receiving space and the transparent tube portion and a second port opening at the second end so as to communicate the plug receiving space and the flexible elongated pipe; a solid cylindrical valve plug rotatably disposed inside the plug receiving space and having a transverse water passage to be selectively aligned with the first and second port openings; and a knob means attached to the valve plug so as to permit manual rotation of the valve plug to align the transverse water passage with the first and second port openings in order to communicate the flexible elongated pipe and the transparent tube portion.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
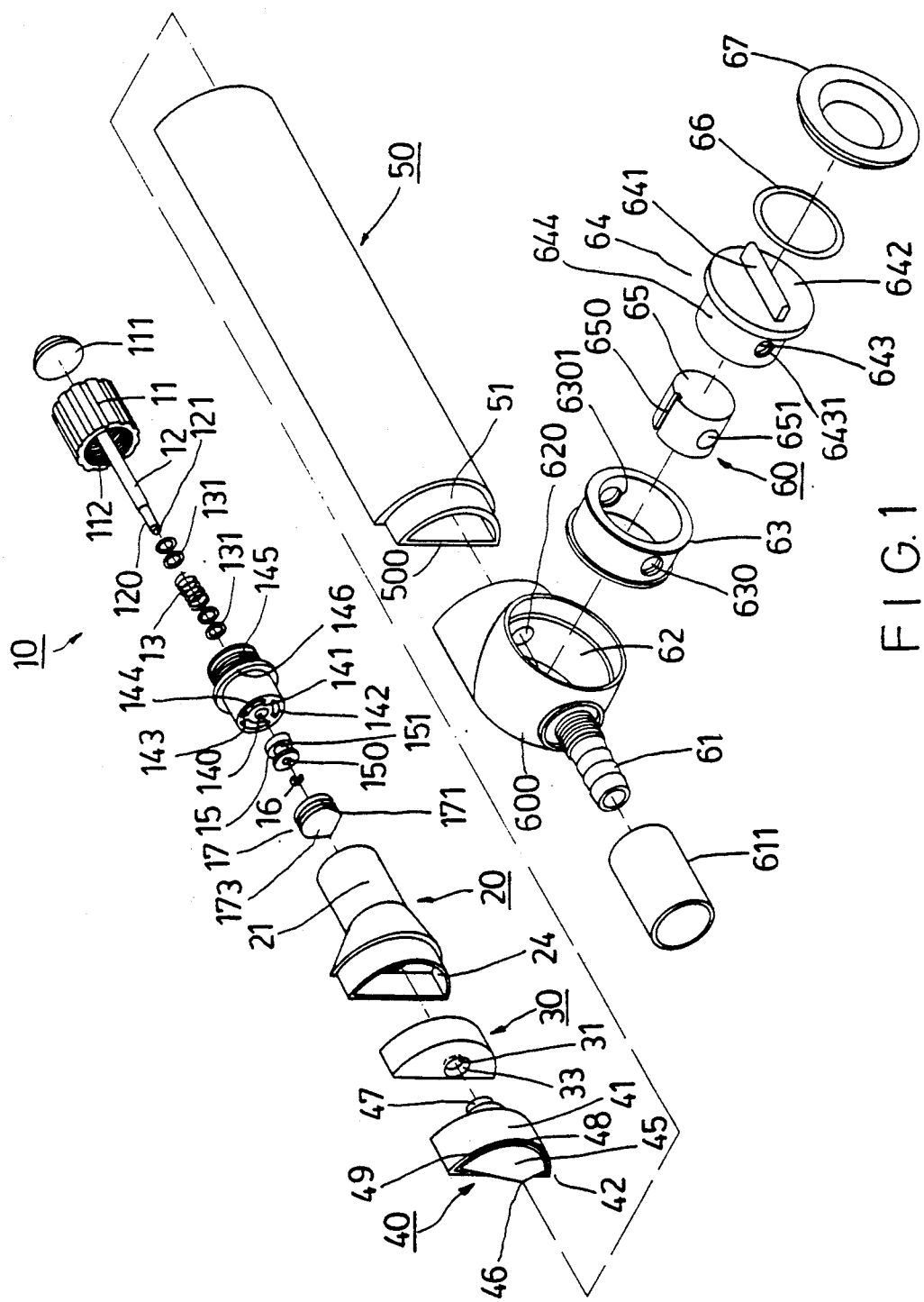
FIG. 1 is a fragmentary exploded view of the preferred embodiment of a level vial according to the present invention.
Figure 2:
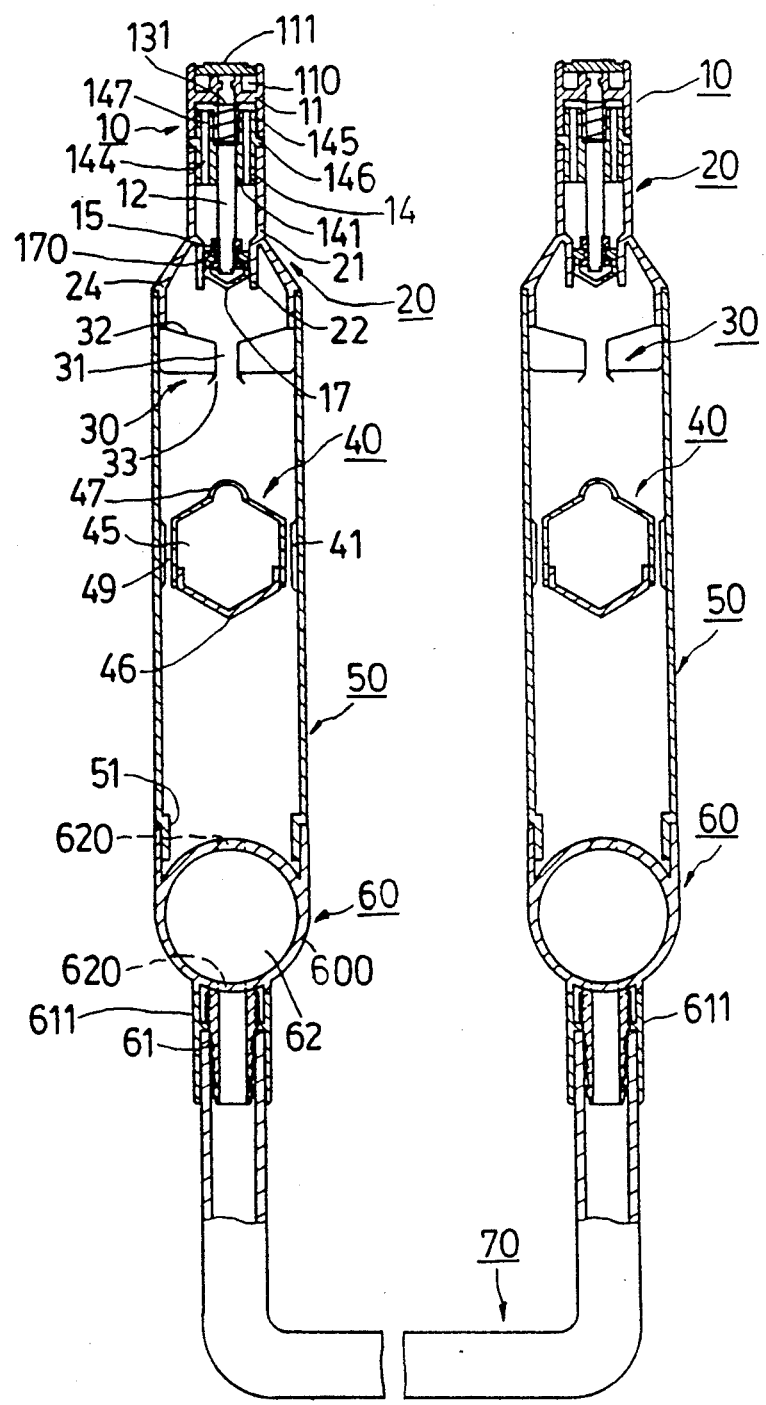
FIG. 2 is a sectional view of the assembled level vial according to the present invention.

Referring to FIGS. 1 and 2, the preferred embodiment of a level vial according to the present invention is shown to comprise a pair of elongated vessels each including a transparent tube 50 and a tube connector 20, an air venting means 10, a float restraining member 30, a floating article 40 and a water valve means 60 provided on each of the transparent tubes 50.

The air venting means 10 includes a plastic tubular rotary cap 11 and an axial guide shaft 12 made of rustproof metal and extending inwardly from a closed end of the rotary cap 11. The closed end of the rotary cap 11 is provided with a receiving space 110 to fittingly receive a cover plate 111. The rotary cap 11 has a lower portion provided with internal screw threads 112. The guide shaft 12 has a distal end portion provided with a diameter reduced portion 120 and an engaging groove 121 disposed adjacent to a tip of the diameter reduced portion 120. Each of the two ends of a coiled spring 13 are attached to a pair of cushioning rings 131. The coiled spring 13 is then provided around the guide shaft 12. The air venting means 10 further includes a plastic air guide member 14 having an inner tube 141 defining an axial through opening 140, an outer tube 142 coaxial with and defining an annular clearance with the inner tube 141, and three spaced connecting ribs 143 interconnecting the inner and outer tubes, 141 and 142, to thereby form three axially extending air passages 144. An upper end portion of the outer tube 142 is provided with external screw threads 145 to engage the internal screw threads 112 of the rotary cap 11 The intermediate portion of the outer tube 142 is provided with a radial outward flange 146. The axial through opening 140 of the inner tube 141 has a wide upper portion 147 aligned with the external screw threads 145. The guide shaft 12 extends through the axial through opening 140. The coiled spring 13 is disposed in the wide upper portion 147 of the axial through opening 140. The lower end portion of the outer tube 142 is fittingly inserted into one end of the tube connector 20. A rubber sleeve member 15 has an axial opening 150 to fittingly receive the diameter reduced portion 120 of the guide shaft 12. The intermediate portion of the sleeve member 15 is provided with an external annular groove 151. A C-shaped fastening ring 16 engages the guide shaft 12 at the engaging groove 121 to prevent separation of the sleeve member 15 from the guide shaft 12. The diameter reduced portion 120 of the guide shaft 12 extends into an open end of a hollow rubber piston 17. The open end of the piston 17 is provided with an inward annular lip 170 press fitted into the annular groove 151 of the sleeve member 15. The intermediate portion of the piston 17 is provided with an external annular groove 171. The piston 17 further has a tapered closed end 173.

The lower end portion of the air guide member 14 extends into and is attached to a neck portion 21 of the tube connector 20. The tube connector 20 is made of plastic and has a flat-sided gradually tapered portion 24 extending rearwardly from one end of the neck portion 21 opposite to the air guide member 14. The tube connector 20 further includes an annular flange 22 similarly extending rearwardly from said one end of the neck portion 21 and forming a clearance with the tapered portion 24. The piston 17 is adapted to slidably extend into the annular flange 22 to seal the axial opening defined by the same.

The float restraining member 30 is made of flexible silicon rubber and is fixed to and extends inwardly from an inner wall surface of each of the transparent tubes 50 adjacent to a top open end of the latter. The float restraining member 30 defines an axial through hole 31 and is provided with a concave top surface 32. Water inside the transparent tube 50 is prevented from collecting above the float restraining member 30 since the contour of the concave top surface 32 forces the water to flow through the through hole 31. The bottom surface of the float restraining member 30 is provided with a flexible conical downwardly extending flange disposed around the periphery defining the through hole 31 and confining an enlarged opening 33.

The floating article 40 is made of plastic and is provided inside each transparent tube 50. The top portion of the floating article 40 is printed with a colored ring so as to facilitate indication of the water level inside the transparent tube 50. The floating article 40 includes a hollow body 45 and an outer ring 41 surrounding the hollow body 45 and confining a clearance with the same. The two ends of the outer ring 41 are gradually flared so as to guide air inside the transparent tube 50 in the direction of the air venting means 10. The hollow body 45 has a tapered bottom end 46 to guide air inside the transparent tube 50 to enter the clearance confined by the outer ring 41 and the hollow body 45. The hollow body 45 further has a flexible ball portion 47 on a tapered top end thereof that is adapted to block the enlarged opening 33 of the float restraining member 30 to prevent water from reaching the air venting means 10. The outer ring 41 is joined to the hollow body 45 via a pair of connecting ribs 48. The clearance defined by the hollow body 45 and the outer ring 41 is thus divided into two through passages 49 which permit air and water flow therethrough.

Each of the transparent tubes 50 is made of plastic and has a top open end, a bottom open end, a flat side wall 500 extending from the top open end to the bottom open end, and a connector head portion 51 disposed on the bottom open end.

The water valve means 60 is provided to control the flow of water in and out of the transparent tube 50 and includes a valve housing 600 having a first end mounted on the connector head portion 51 of the transparent tube 50. A second end of the valve housing 600 is provided with a pipe connector 61. A sleeve 611 is provided on the valve housing 600 so as to cover the pipe connector 61. The valve housing 600 defines a plug receiving space 62 accessible from a front side thereof. The valve housing 600 further has first and second port openings 620 disposed on the first and second ends thereof so as to respectively communicate the transparent tube 50 and the pipe connector 61 with the receiving space 62. An outer ring member 63 is coaxially disposed inside the receiving space 62 and is provided with a pair of radial through holes 630 aligned with the port openings 620 of the valve housing 600. The outer ring member 63 is further provided with two inwardly extending radial annular flanges 6301 disposed at the periphery defining the through holes 630. A rotary knob member 64 includes a circular plate 642 with a frontward knob projection 641 and a rearward tubular projection 644 provided with a pair of radial through holes 643 to be aligned with the radial through holes 630 of the outer ring member 63. The tubular projection 644 is further provided with an inwardly projecting and axially extending rib projection (not shown) and a pair of annular shoulders 6430 disposed at the periphery defining the through holes 643 to receive the radial annular flanges 6301 of the outer ring member 63. A solid cylindrical valve plug 65 is disposed inside the tubular projection 644 and is provided with an axially extending groove 650 to receive the inward rib projection of the rotary knob member 64. The valve plug 65 is further provided with a transverse water passage 651. A sealing ring 66 is provided around the knob projection 641 of the rotary knob member 64. Finally, an annular cover 67 is mounted on the front access end of the receiving space 62 of the valve housing 600 by means of high frequency sealing. The rotary knob member 64 is manually operated so as to rotate the valve plug 65 and align the transverse water passage 651 with the port openings 620 so as to communicate the pipe connector 61 and the transparent tube 50.

During use, the pipe connector 61 inside the sleeve 611 is attached to one end of a flexible elongated pipe 70 so as to communicate with and fill up the transparent tubes 50 with water. The preferred embodiment can now be used to accurately level two points that are far apart or otherwise difficult to measure.

Assembly of the preferred embodiment is as follows: The water valve means 60 is attached to the connector head portion 51 at the bottom open end of the transparent tube 50. The floating article 40 is then provided inside the transparent tube 50. The float restraining member 30 is then fixed inside the transparent tube 50 adjacent to the top open end of the same. The air venting means 10 is then provided on one end of the tube connector 20. The tube connector 20 is then mounted on the top open end of the transparent tube 50. Finally, the pipe connector 61 of the water valves 60 is attached to one end of the flexible elongated pipe 70 so as to communicate and fill up the transparent tubes 50. This permits accurate leveling of two points that are far apart or otherwise difficult to measure.

Figure 3:
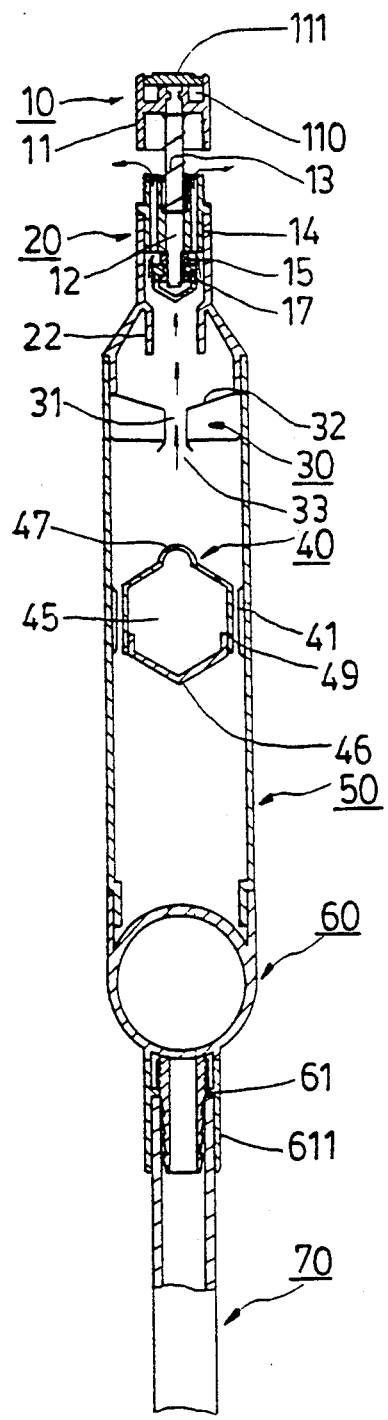
FIG. 3 is a fragmentary sectional view of the preferred embodiment when vented to the ambient environment.

FIG. 3 illustrates the preferred embodiment when one of the transparent tubes 50 thereof is vented to the ambient atmosphere. The arrows indicate how air flows out of the transparent tube 50. When the rotary cap 11 is rotated so as to disengage the air guide member 14, the coiled spring 13 expands to push the rotary cap 11 upward and move the piston 17 to unblock the opening defined by the annular flange 22. The coiled spring 13 keeps the rotary cap 11 away from the air guide member 14 to prevent the piston 17 from untimely blocking the opening of the annular flange 22. Thus, air inside the transparent tube 50 flows through the air passages 144 of the air guide member 14 to the ambient environment. The sleeve member 15 abuts against the inner tube 141 of the air guide member 14 and prevents detachment of the guide shaft 12 from the rotary cap 11.

Figure 4A:
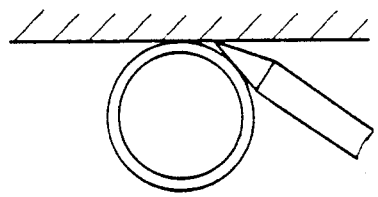
FIG. 4A is a top sectional view of a transparent tube of the conventional level vial when placed against a vertical wall surface.
Figure 4B:
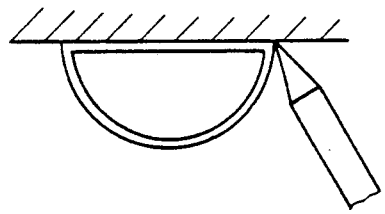
FIG. 4B is a top sectional view of a transparent tube of the level vial of the present invention when placed against a vertical wall surface.

The advantages of using the preferred embodiment of a level vial according to the present invention are as follows:

1. Referring to FIG. 4A, the cross-section of a transparent tube of the conventional level vial is annular. Thus, when the transparent tube is placed against a vertical wall surface so as to mark a height level on the same, the tip of the marking pen should be properly inserted in the space defined by the transparent tube and the wall surface. The marking pen is thus handled in an awkward position, thereby causing one to easily make a mistake. In contrast with conventional level vials, the transparent tube of the level vial of the present invention is flat-sided, thereby facilitating stable positioning of the same against a vertical wall surface, and therefore making it easier to accurately mark a height level on the vertical wall surface.

2. Water and air can freely flow back and forth through the clearance between the outer ring 41 and the hollow body 45 of the floating article 40. Thus, no water is retained between the floating article 40 and the transparent tube 50, unlike that of conventional level vials.

3. The level vial of the present invention is provided with a water valve means 60 to control the flow of water through the transparent tubes 50.

4. In the event that one of the transparent tubes 50 is held at a much higher position relative to the other transparent tube 50, the ball portion 47 of the floating article 40 in the lower one of the transparent tubes 50 will block the enlarged opening 33 of the float restraining member 30 and thereby prevent water from overflowing.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. A level vial, comprising:
   a pair of elongated vessels, each including a transparent tube portion having a top open end and a bottom open end, a gradually tapered portion extending from said top open end of said transparent tube portion, a neck portion extending outwardly from one end of said tapered portion, and an annular flange extending inwardly from said one end of said tapered portion and defining an axial opening;
   a flexible elongated pipe having two ends respectively connected to said bottom open end of said transparent tube portion of said elongated vessels to communicate with said transparent tube portion so as to contain water therein;
   a pair of air venting means, each of which including a solid cylindrical air guide member having a lower end portion sealingly extending into said neck portion, an upper end portion extending outwardly from said lower end portion, an axial through opening and axially extending air passages; a tubular rotary cap having a closed top end and a lower portion screwed to said upper end portion of said air guide member; an axial guide shaft extending inwardly from said closed top end of said rotary cap through said axial through opening of said air guide member and having a distal end provided with a piston to selectively extend into said annular flange and seal said axial opening of said annular flange; and a spring means provided around said guide shaft and maintaining said rotary cap away from said air guide member when said rotary cap is unscrewed from said air guide member;

a float restraining member fixed to and extending inwardly from an inner wall surface of said transparent tube portion of each of said elongated vessels, said float restraining member being disposed adjacent to said top open end of said transparent tube portion and defining an axial through hole; and a floating article provided in said transparent tube portion of each of said elongated vessels inwardly of said float restraining member, said floating article blocking said axial through hole of said float restraining member when water inside said transparent tube portion rises to the vicinity of said top open end of said transparent tube portion.

2. The level vial as claimed in claim 1, wherein said transparent tube portion has a flat side wall extending from said top open end to said bottom open end.

3. The level vial as claimed in claim 1, wherein said floating article comprises an outer ring in sliding contact with said inner wall surface of said transparent tube portion, a hollow body surrounded by and confining a clearance with said outer ring, and a plurality of spaced connecting ribs to join said outer ring and said hollow body.

4. The level vial as claimed in claim 3, wherein said hollow body has tapered top and bottom ends.

5. The level vial as claimed in claim 4, wherein said tapered top end of said hollow body is provided with a ball portion to block said axial through hole of said float restraining member when water rises to the vicinity of said top open end of said transparent tube portion.

6. The level vial as claimed in claim 1, further comprising a water valve means provided on said bottom open end of said transparent tube portion of each of said elongated vessels, said water valve means including:

a hollow valve housing having a first end connected to said bottom open end of said transparent tube portion and a second end connected to one end of said flexible elongated pipe, said hollow valve housing defining a plug receiving space disposed between said first and said second ends, said hollow valve housing having a first port opening at said first end so as to communicate said plug receiving space and said transparent tube portion and a second port opening at said second end so as to communicate said plug receiving space and said flexible elongated pipe;

a solid cylindrical valve plug rotatably disposed inside said plug receiving space and having a transverse water passage to be selectively aligned with said first and second port openings; and a knob means attached to said valve plug so as to permit manual rotation of said valve plug to align said transverse water passage with said first and second port openings in order to communicate said flexible elongated pipe and said transparent tube portion.

7. A level vial, comprising:

a pair of elongated vessels, each having a top open end, a bottom open end and a transparent tube portion having a flat side wall extending between said top open end and said bottom open end;

a flexible elongated pipe having two ends respectively connected to said bottom open end of said elongated vessels to communicate with said transparent tube portion so as to contain water therein;

an air venting means provided on said top open end of each of said elongated vessels so as to selectively communicate said transparent tube portion with the ambient environment;

a float restraining member fixed to and extending inwardly from an inner wall surface of said transparent tube portion of each of said elongated vessels, said float restraining member being disposed adjacent to said top open end of said elongated vessel and defining an axial through hole; and a floating article provided in said transparent tube portion of each of said elongated vessels inwardly of said float restraining member, said floating article blocking said axial through hole of said float restraining member when water inside said transparent tube portion rises to the vicinity of said top open end of said elongated vessel;

wherein:

each of said elongated vessels includes a gradually tapered portion extending from a top open end of said transparent tube portion, a neck portion extending outwardly from one end of said tapered portion, and an annular flange extending inwardly from said one end of said tapered portion and defining an axial opening;

each of said air venting means includes a solid cylindrical air guide member having a lower end portion sealingly extending into said neck portion, an upper end portion extending outwardly from said lower end portion, an axial through opening and axially extending air passages; a tubular rotary cap having a closed top end and a lower portion screwed to said upper end portion of said air guide member; an axial guide shaft extending inwardly from said closed top end of said rotary cap through said axial through opening of said air guide member and having a distal end provided with a piston to selectively extend into said annular flange wall portion and seal said axial opening of said annular flange; and a spring means provided around said guide shaft and maintaining said rotary cap away from said air guide member when said rotary cap is unscrewed from said air guide member.

8. A level vial, comprising:

a pair of elongated vessels, each having a top open end, a bottom open end and a transparent tube portion having a flat side wall extending between said top open end and said bottom open end;

a flexible elongated pipe having two ends respectively connected to said bottom open end of said elongated vessels to communicate with said transparent tube portion so as to contain water therein;

an air venting means provided on said top open end of each of said elongated vessels so as to selectively communicate said transparent tube portion with the ambient environment;

a float restraining member fixed to and extending inwardly from an inner wall surface of said transparent tube portion of each of said elongated vessels, said float restraining member being disposed adjacent to said top open end of said elongated vessel and defining an axial through hole; and a floating article provided in said transparent tube portion of each of said elongated vessels inwardly of said float restraining member, said floating article blocking said axial through hole of said float restraining member when water inside said transparent tube portion rises to the vicinity of said top open end of said elongated vessel;

wherein said floating article comprises an outer ring in sliding contact with said inner wall surface of said transparent tube portion, a hollow body surrounded by and confining a clearance with said outer ring, and a plurality of spaced connecting ribs to join said outer ring and said hollow body.

9. The level vial as claimed in claim 8, wherein said hollow body has tapered top and bottom ends.

10. The level vial as claimed in claim 9, wherein said tapered top end of said hollow body is provided with a ball portion to block said axial through hole of said float restraining member when water rises to the vicinity of said top open end of said transparent tube portion.

11. A level vial, comprising:
a pair of elongated vessels, each having a top open end, a bottom open end and a transparent tube portion having a flat side wall extending between said top open end and said bottom open end;
a flexible elongated pipe having two ends respectively connected to said bottom open end of said elongated vessels to communicate with said transparent tube portion so as to contain water therein;
an air venting means provided on said top open end of each of said elongated vessels so as to selectively communicate said transparent tube portion with the ambient environment;
a float restraining member fixed to and extending inwardly from an inner wall surface of said transparent tube portion of each of said elongated vessels, said float restraining member being disposed adjacent to said top open end of said elongated vessel and defining an axial through hole; and
a floating article provided in said transparent tube portion of each of said elongated vessels inwardly of said float restraining member, said floating article blocking said axial through hole of said float restraining member when water inside said transparent tube portion rises to the vicinity of said top open end of said elongated vessel;
further comprising a water valve means provided on said bottom open end of said transparent tube portion of each of said elongated vessels, said water valve means including:
a hollow valve housing having a first end connected to said bottom open end of said transparent tube portion and a second end connected to one end of said flexible elongated pipe, said hollow valve housing defining a plug receiving space disposed between said first and said second ends, said hollow valve housing having a first port opening at said first end so as to communicate said plug receiving space and said transparent tube portion and a second port opening at said second end so as to communicate said plug receiving space and said flexible elongated pipe;
a solid cylindrical valve plug rotatably disposed inside said plug receiving space and having a transverse water passage to be selectively aligned with said first and second port openings; and
a knob means attached to said valve plug so as to permit manual rotation of said valve plug to align said transverse water passage with said first and second port openings in order to communicate said flexible elongated pipe and said transparent tube portion.

* * * * *